C. P. & A. J. STRITE.
GOVERNOR CONTROLLED CLUTCH.
APPLICATION FILED JAN. 15, 1913.

1,126,124.

Patented Jan. 26, 1915.
2 SHEETS—SHEET 1.

Witnesses.
A. H. Opsahl.
Geo. Knutson.

Inventors
Charles P. Strite
Albert J. Strite
By their Attorneys
Williamson Merchant C. P. & A. J. STRITE.
GOVERNOR CONTROLLED CLUTCH.
APPLICATION FILED JAN. 15, 1913.

1,126,124.

Patented Jan. 26, 1915.
2 SHEETS—SHEET 2.

Witnesses
A. H. Opsahl.
Geo. Knutson.

Inventor
Charles P. Strite
Albert J. Strite
By their Attorneys
Williamson Merchant

UNITED STATES PATENT OFFICE.

CHARLES P. STRITE AND ALBERT J. STRITE, OF MINNEAPOLIS, MINNESOTA, ASSIGNORS, BY DIRECT AND MESNE ASSIGNMENTS, TO HORTON MANUFACTURING COMPANY, OF MINNEAPOLIS, MINNESOTA, A CORPORATION.

GOVERNOR-CONTROLLED CLUTCH.

1,126,124. Specification of Letters Patent. Patented Jan. 26, 1915.

Application filed January 15, 1913. Serial No. 742,150.

*To all whom it may concern:*

Be it known that we, CHARLES P. STRITE and ALBERT J. STRITE, citizens of the United States, residing at Minneapolis, in the county of Hennepin and State of Minnesota, have invented certain new and useful Improvements in Governor-Controlled Clutches; and I do hereby declare the following to be a full, clear, and exact description of the invention, such as will enable others skilled in the art to which it appertains to make and use the same.

Our invention has for its object to provide a simple and highly efficient automatically releasable centrifugal clutch, or, in other words, a governor controlled clutch which will be automatically released whenever a predetermined speed of rotation is exceeded.

Generally stated, the invention consists of the novel devices and combinations of devices hereinafter described and defined in the claims.

A clutch of the above character is capable of a great many different uses but will be found especially serviceable for use in driving connections to cream separators. For efficiency, the bowls of these cream separators must be rotated at such high speed that a slightly greater speed is likely to cause centrifugal force to explode or break the bowl. Hence, the great importance of a governor controlled or self releasing clutch which may be set to transmit the desired high speed, but which will, throw the driving connections out of action whenever this predetermined desired speed is exceeded.

In the accompanying drawings which illustrate the improved centrifugal clutch, like characters indicate like parts throughout the several views.

Figure 1:
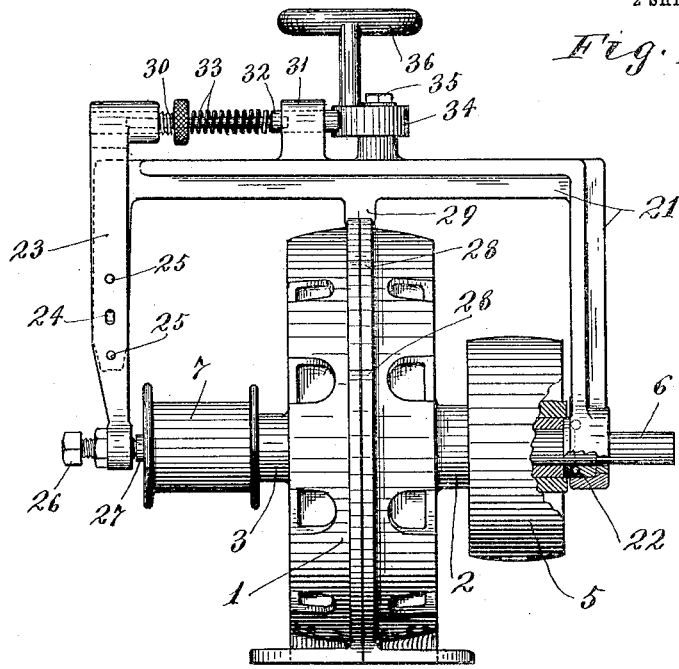
Figure 2:
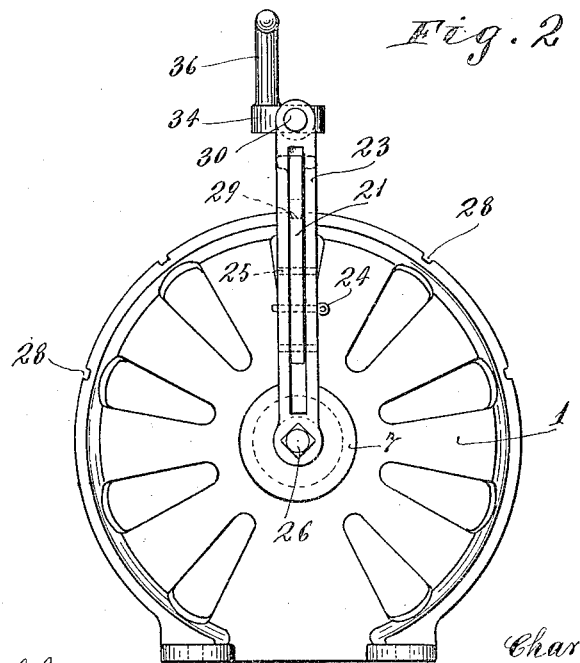
Figure 3:
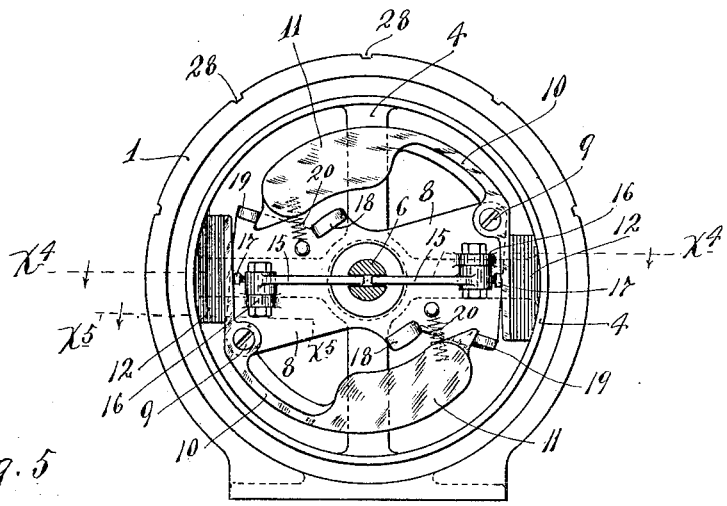
Figure 5:
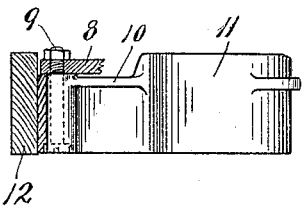
Figure 4:
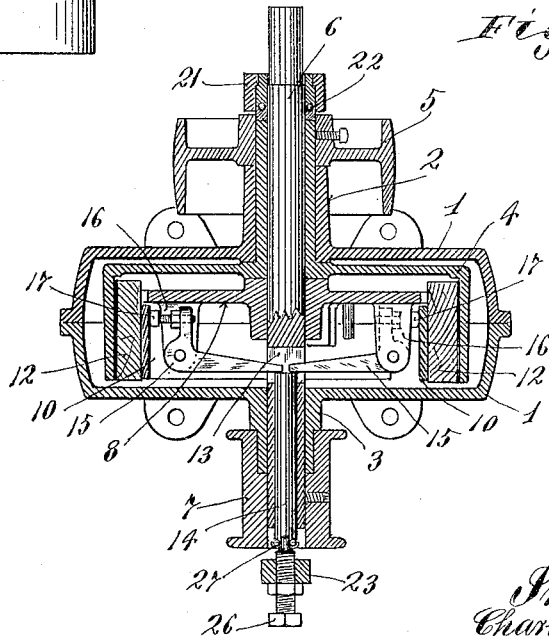

Referring to the drawings, Figure 1 is a view in front elevation showing the improved clutch mechanism, some parts being broken away; Fig. 2 is a side elevation of the parts shown in Fig. 1; Fig. 3 is a side elevation of the clutch with one-half of the case thereof removed; Fig. 4 is a horizontal section taken through the complete clutch mechanism on the line $x^4$ $x^4$ on Fig. 3; and Fig. 5 is a detail in horizontal section taken approximately on the line $x^5$ $x^5$ on Fig. 3.

The clutch mechanism proper is preferably arranged to run in a bearing afforded by a two-part casing 1, having axially projecting bearing hubs 2 and 3. Working within the casing 1 is a clutch drum 4 in the form of a disk having a cylindrical flange, and provided with a sleeve-like hub, which latter is journaled in the hub 2, and has a driving pulley 5 secured thereto. A power driven belt, not shown, will run over the said driving pulley 5. Extended through and loosely journaled in the sleeve-like hub of the clutch drum 4 is a shaft 6 that is also extended through and journaled in the hub 3 of the casing 1. A driven pulley 7 is rigidly secured to the projecting end of the shaft 6 that is also extended through and journaled in the hub 3 of the casing 1, and, as shown, is loosely telescoped over a portion of the hub 3.

Secured to the shaft 6 within the casing 1 and within the flange of the clutch drum 4, is a clutch head 8. Pivoted to the head 8 at diametrically opposite points marked 9, are clutch levers 10 having weighted ends 11 and provided at their other ends with clutch shoes 12 of wood, wood fiber, or other suitable material, and which shoes are normally in frictional engagement with the interior of the cylindrical flange of the clutch drum 4.

The shaft 6, within the casing 1, close to the hub of the head 8 is formed with a diametrical slot 13, and seated in an axial seat which is formed in the shaft 6 and extending from the slots 13 thereof, to the adjacent outer end of said shaft, is a clutch acting plunger 14. The inner end of this plunger 14 engages the inner ends of a pair of clutch acting bell cranks 15 that are pivoted to lugs 16 on the head 8. The short arms of these bell cranks 15 are provided with adjustable set screws 17 that normally engage with the backs of the clutch shoes 12, or within the short ends of the levers 10, which latter are directly secured to the backs of the said shoes.

Extreme movements of the levers 10 are limited by stop lugs 18 and 19 on the head 8, and light coiled compression springs 20 are attached to said head and to the weighted ends of said levers, tending to hold the weighted ends of said levers against the said stop 19. These springs 20, therefore, tend to hold the clutch shoes 12 away from the cylindrical flange of the clutch drum 4.

The numeral 21 indicates a yoke, one arm of which is journaled on one end of the shaft 6 and has a thrust ball bearing device 22 set therein. The other arm of this yoke is a short arm which is completed by a lever 23 that is intermediately pivoted thereto by a bolt or pin 24 insertible through any one of several alined perforations 25 in the said lever and arm. As best shown in Fig. 2, the lever 23 is bifurcated and embraces the short arm of the yoke 21. The lower end of the lever 23 is provided with a set screw 26 having a cone end engaged with an axial perforation in the projecting end of the clutch actuating bolt 14, a thrust ball bearing 27 being preferably interposed between the end of said bolt and the shoulder on the said set screw.

The adjoining edges of the two sections of the casing 1 are preferably formed with projecting flanges having circumferentially spaced lock notches 28. The transverse bar of the yoke 21 has an independent lock lug 29 adapted to be set in engagement with any one of the notches 28 to thereby hold the yoke either in an upright position or in a horizontal position or any desired angular position on either side of an upright position. This is important because it permits the yoke to be set so that it will clear a belt running in a direction over the driving pulley 5.

The upper end of the lever 23 has a sleeve-like hub in which is screwed a sleeve-like adjusting nut 30. Mounted to slide through a lug 31 on the yoke 21 is a small plunger 32 having a reduced stem telescoped into or through the adjusting nut 30. The main clutch setting spring is in the form of a spring coil 33 placed around the reduced stem of the plunger 32 and compressed between the shoulder thereof and the adjusting nut 30. When the lever 23 is actuated by the weighted clutch shoes, the adjusting nut 30, on the free end of said lever, moves telescopically onto the reduced stem of the plunger 32, and thereby compresses the spring 33.

The inner end of the plunger 32 is engaged by an eccentric or cam block 34 pivotally connected at 35 to the cross bar of the yoke 21 and provided with an operating end piece 36.

It has already been made clear that the clutch shoes are, by the spring 33, set against the clutch drum so that the pulley 7 will be driven with the pulley 5 and the cream separator by a suitable belt not shown, will be driven from the pulley 7. When the predetermined desired speed is exceeded, centrifugal force will throw outward the weighted ends 11 of the levers 10 and thereby carry the shoes 12 inward out of frictional contact with the flange of the clutch drum 4. This, of course, will uncouple the driven pulley 7 from the driving pulley 5 and allow the latter to rotate at a speed lower than that of the said driving pulley. Inasmuch as the clutch head 8 moves or rotates with the driven pulley 7, the spring 33 will reëstablish engagement between the clutch shoes and drum, the instant that the speed of said driven pulley is slightly below the predetermined desired speed. This predetermined desired speed may be varied by varying the tension of the spring 33, it being, of course, obvious that the greater the tension of the spring, the higher will be the speed required to throw the clutch out of action. When the spring 33 is set at the proper tension for the desired speed, the said spring may be thrown into and out of action, at will, by rotation of the eccentric or cam 34. When the said eccentric is rotated, so as to allow the plunger 32 to move toward the axis thereof, the levers 10 will be relieved from the tension of the spring 33, and the relatively light compression springs 20 will then throw the outer ends of the said levers agains the stop lugs 19, as shown in Fig. 3, thereby releasing the shoes. When, however, the eccentric 34 is moved so as to force the plunger 32 outward, as shown in Fig. 1, the tension of the springs 20 will be overcome and the shoes 12 will be forced into frictional engagement with the flange of the clutch drum 4, thereby setting the clutch for action. Cream separators, for example, of different sizes, will require greater driving friction to maintain the predetermined desired speed and to a considerable extent, this may be provided for by adjustment of the tension of the springs 33. However, greater variation in pressure is desired than can be accomplished simply by adjustment of the tension of the said spring, and a provision for such adjustment is found in the variable pivotal connections 24 and 25 between the lever 23 and the short arm of the yoke 21.

This improved clutch mechanism is of simple construction, strong and durable, and is capable of a large range of adjustment, so that it is adapted not only to propel a certain machine at different predetermined speeds, but may be used to drive various different machines of different sizes, and which require a wide range of different driving force.

Slack produced by wear of the shoes 12 may be taken up either by adjusting the screw 26 or the set screws 17. Adjustments of the screw 26 simultaneously adjust the two levers 10 and the shoes 12 carried thereby, while the set screws 17 afford means for independently adjusting the said levers and shoes. In fact, the independent adjustments are necessary to properly set the two shoes for initial action. Whenever a slight correction or adjustment of both shoes is required, this may be quickly accomplished by adjustment of the set screw 26.

What we claim is:

1. In a centrifugal clutch, the combination with a constantly running driving member and a clutch drum carried thereby, of a driven member and a clutch head connected for rotation therewith, weighted levers pivoted to said clutch head and provided with clutch shoes for frictional engagement with said clutch drum, relatively light retracting springs operative on said levers and tending to retract said shoes, and a relatively powerful spring tension device and connections operative on said levers to yieldingly hold said clutch shoes frictionally engaged with said drum, but adapted to be overcome by centrifugal force acting on the weighted ends of said levers, to release said clutch when a predetermined speed is exceeded.

2. In a centrifugal clutch, the combination with driving and driven members and a friction clutch for connecting the same, of means for holding said clutch set, comprising a lever having an adjustable fulcrum, and an adjustable spring operative on said lever.

3. In a centrifugal clutch, the combination with driving and driven members and a friction clutch for connecting the same, of clutch actuating connections comprising a lever, a spring operative on said lever to hold said clutch set, and a displaceable base of re-action for said spring.

4. In a centrifugal clutch, the combination with driving and driven members and a friction clutch for connecting the same, of clutch actuating connections comprising a lever, a spring operative on said lever to hold said clutch set, a displaceable base of re-action for said spring, and centrifugally actuated weighted elements operative to release said clutch in opposition to the tension of said spring.

5. In a centrifugal clutch, the combination with axially alined driving and driven members, the former including a clutch drum, and the latter a clutch head, of weighted levers pivoted to said head and provided with clutch shoes engageable with said clutch drum, bell crank levers pivoted to said clutch head and operative on said shoes to hold the same engaged with said clutch drum, a plunger axially seated in said driven member, a lever pivoted to a relatively fixed support, and a spring operative on said lever to hold said clutch shoes engaged with said clutch drum.

6. In a centrifugal clutch, the combination with axially alined driving and driven members, the former including a clutch drum and the latter a clutch head, of weighted levers pivoted to said head and provided with clutch shoes engageable with said clutch drum, bell crank levers pivoted to said clutch head and operative on said shoes to hold the same engaged with said clutch drum, a plunger axially seated in said driven member, a lever pivoted to a relatively fixed support, a spring operative on said lever to hold said clutch shoes engaged with said clutch drum, means for varying the set tension of said spring, and a displaceable base of re-action for said spring movable to throw the said spring tension device into or out of action at will, without changing the set adjustment thereof.

7. In a centrifugal clutch, the combination with driving and driven members and a clutch for connecting the same, of a pivotally adjustable yoke associated with said driving and driven members, and clutch actuating connection applied in part to said yoke and movable therewith.

8. In a centrifugal clutch, the combination with axially alined driving and driven members, respectively, including a clutch drum and a clutch head, of weighted levers pivoted to said clutch head and having clutch shoes engageable with said clutch drum, bell crank levers pivoted to said clutch head and operative on the said weighted shoe-equipped levers, a plunger axially seated in said driven member and operative on said bell cranks, a casing supporting said driving and driven members, a yoke pivotally adjustable on the axis of said driving and driven members and arranged to be secured to said casing in different positions, a lever pivoted to said yoke operative on said plunger, and a spring tension device mounted on said yoke and operative on said lever, substantially as described.

In testimony whereof we affix our signatures in presence of two witnesses.

CHAS. P. STRITE.
ALBERT J. STRITE.

Witnesses:
EDITH E. HANNA,
HARRY D. KILGORE.